United States Patent
Ichikawa et al.

(10) Patent No.: US 6,907,969 B2
(45) Date of Patent: Jun. 21, 2005

(54) ACTIVE TYPE DYNAMIC DAMPER

(75) Inventors: Hiroyuki Ichikawa, Kani (JP); Atsushi Muramatsu, Komaki (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 10/615,900

(22) Filed: Jul. 10, 2003

(65) Prior Publication Data

US 2004/0017033 A1 Jan. 29, 2004

(30) Foreign Application Priority Data

Jul. 11, 2002 (JP) ........................................ 2002-202364

(51) Int. Cl.$^7$ ................................................ F16F 15/02
(52) U.S. Cl. .................. 188/379; 188/380; 267/140.14; 267/136
(58) Field of Search ................................ 188/378, 379, 188/380; 267/140.12, 140.13, 140.14, 136

(56) References Cited

U.S. PATENT DOCUMENTS 4,744,547 A * 5/1988 Hartel ........................ 267/141
5,505,282 A * 4/1996 Olgac ........................ 188/379

FOREIGN PATENT DOCUMENTS

| JP | 2936989 | 6/1999 |
| JP | 2002-31188 | 1/2002 |

* cited by examiner

Primary Examiner—Matthew C. Graham
(74) Attorney, Agent, or Firm—Oblon, Spivak, McClelland, Maier & Neustadt, P.C.

(57) ABSTRACT

A damper main body of a dynamic damper comprises a long flat mounting plate portion, a rod-like central supporting metal member which is erected vertically in the center of a top face of the mounting plate portion, constituting a supporting member together with the mounting plate portion, cylindrical rubber bushings placed on the central supporting metal member in succession from its bottom side, a coil member, a magnet portion, a yoke and a cylindrical case mounted over the yoke. Grommets, which are cylindrical supporting portions made of rubber elastic bodies, are inserted into mounting holes in side plate portions of the mounting plate portion. The damper main body is fixed on a mating plate member through the compressed grommets such that it is floated over the mating plate member.

3 Claims, 4 Drawing Sheets

ACTIVE TYPE DYNAMIC DAMPER

BACKGROUND OF THE INVENTION

The present invention relates to an active dynamic damper suitable to actively damp a vibration from a vibration generating source such as a vehicle.

A conventionally known active dynamic damper of this kind comprises mainly an electromagnetic vibration means, which is a vibration means, and an electric control unit. In this electromagnetic vibration means, a yoke which accommodates an electromagnet is mounted on a mounting metal member scheduled to be installed on, for example, a vehicle body, which is a vibration generating source, and a mass member is provided on the yoke such that it is supported elastically by means of a rubber elastic body. The electric control unit inputs an electric control signal into the electromagnet so as to generate a driving force corresponding to the magnitude of the electric control signal. This electromagnetic vibration means is intended to drive the electromagnet and thereby vibrate the mass member in order to actively suppress a vibration of the vibration generating source with a vibration force generated on the mass member.

A linear amplifier such as an audio amplifier can be used as a driver for driving this electromagnetic vibration means, but in this case the driver cost is high because the linear amplifier is expensive. For this reason, if the active dynamic damper is used for a low cost application such as a vehicle application, a pulse width modulation driver (hereinafter referred to as PWM driver) which turns ON/OFF a switching transistor using, for example, a pulse-width modulated control pulse signal is used to generate an electric control signal for driving the electromagnetic vibration means. The control pulse signal for use in this case is formed by overlaying a reference pulse signal on a pulse-width modulated carrier signal having a frequency of several kHz (4–20 kHz) by means of a PWM driver. The reference pulse signal is synchronous with an input pulse signal S, which is an output of a rotation pulse sensor or the like correlated to the vibration frequency of the vibration generation source and at the same time shifted by a phase θ, while the magnitude of a control amplitude corresponding to the vibration amplitude of the vibration generation source is correlated to the magnitude of duty ratio. The conventional dynamic damper vibrates the mass member by driving the vibration means based on this control pulse signal so as to suppress the vibration of the vehicle body with a vibration force based on this vibration. Generally, sampling of the input pulse signal S is carried out under 1–2 kHz.

However, the above-mentioned active dynamic damper has a problem that when such a vibration means having a high linearity is driven by the aforementioned control pulse signal, a chattering vibration and an abnormal sound by such as a sharp sound originated from the carrier frequency of the control pulse signal and a rattling sound originated from the sampling frequency of the inputted pulse signal, are likely to be generated. Another vibration means for a mass member, similar to the electromagnetic vibration means, is a pneumatic vibration means.

In the pneumatic vibration means, the mass member is elastically supported with respect to a mounting member attached to the vibration damping object member. A pneumatic chamber sealed tightly for applying a vibration force to the mass member through changes in internal pressure is provided and a driving selection valve which connects the pneumatic chamber selectively to a negative pressure source or atmosphere is provided in an air flow path. The driving selection valve is controlled according to the aforementioned control pulse signal, so as to adjust the vibration force frequency, phase and amplitude of the mass member. The pneumatic chamber of the pneumatic vibration means is connected to the negative pressure source like an engine suction port and to the atmosphere through the air flow path, and change-over between the negative pressure source and the atmosphere is carried out by the selection valve imposed in the air flow path. Consequently a change in pressure is generated in the pneumatic chamber so as to adjust the vibration force for vibrating the mass member. However, this pneumatic vibration means has the same problem as the above-described electromagnetic vibration means.

SUMMARY OF THE INVENTION

An object of the present invention is to solve the above-described problem and provide an active dynamic damper capable of suppressing generation of a chattering vibration and an abnormal sound by such as a sharp sound originated from a carrier frequency of a control pulse signal and a rattling sound originated from a sampling frequency of an input pulse signal, if a vibration means having a high linearity is driven with a control pulse signal.

To achieve the above object, according to the present invention, there is provided an active dynamic damper comprising: a supporting member having amounting plate portion; a mass member disposed on a surface side of the mounting plate portion such that it is apart from the mounting plate portion; a rubber elastic body connecting portion which elastically connects the supporting member with the mass member; and a vibration means which vibrates the mass member with a driving force generated by an input of a control pulse signal corresponding to vibration of a vibration generating source, the mounting plate portion being fixed to a vibration damping object member, wherein the mounting plate portion is fixed to the vibration damping object member through a rubber elastic supporting portion such that it is apart from the vibration damping object member.

According to the present invention, the vibration means generates a driving force corresponding to the control pulse signal which is inputted to answer a vibration input from the vibration damping object member so as to vibrate the mass member. Consequently, the vibration input can be damped by resonance action between the mass member and the rubber elastic body connecting portion. Because the mounting plate portion is fixed on the vibration damping object member through the rubber elastic body supporting portion in a condition that it is departed from the vibration damping object member, the rubber elastic body supporting portion suppresses generation of abnormal sound of more than several kHz and a chattering vibration, originated from the control frequency and the like of the control pulse signal. Further, because the rubber elastic body supporting portion functions as a passive damper together with the rubber elastic body connecting portion, the performance of damping the vibration input of the dynamic damper is further enhanced. As a result, according to the present invention, the dimensions of the dynamic damper can be reduced relatively. Further, the resonance operation of the rubber elastic body supporting portion raises the vibration force in an intermediate frequency range which is higher than the frequency of the vibration input and lower than the control frequency.

Further, in the active dynamic damper of the present invention, the control pulse signal may be formed by overlaying a pulse width modulated carrier signal having a control frequency of several kHz several tens kHz on a reference pulse signal having the same frequency as the vibration frequency of an input pulse signal corresponding to vibration of a vibration generating source and adjusted in terms of phase and gain.

When the vibration means is driven according to the control pulse signal, because the mounting plate portion is fixed to the vibration damping object member through the rubber elastic body supporting portion in a condition that it is apart from the vibration damping object member, generation of a chattering vibration and an abnormal sound of more than several kHz, such as a sharp sound originated from the control frequency of the carrier signal pulse-width modulated by the rubber elastic body supporting portion and a rattling sound originated from the sampling frequency of the inputted pulse signal, is suppressed effectively.

In the active dynamic damper of the present invention, a resonance frequency of the rubber elastic body supporting portion with respect to the mass member may be set to a frequency region that is higher than the vibration frequency and lower than the control frequency of the carrier signal. Because the resonance region is provided in a frequency region which is higher than the vibration frequency of the vibration generation source and lower than the control frequency of the control pulse signal, resonance of the rubber elastic body supporting portion with the mass member raises the vibration force in the resonance region, thereby reducing gear noise and the like.

DESCRIPTION OF THE PREFERRED EMBODIMENTS

Figure 1:
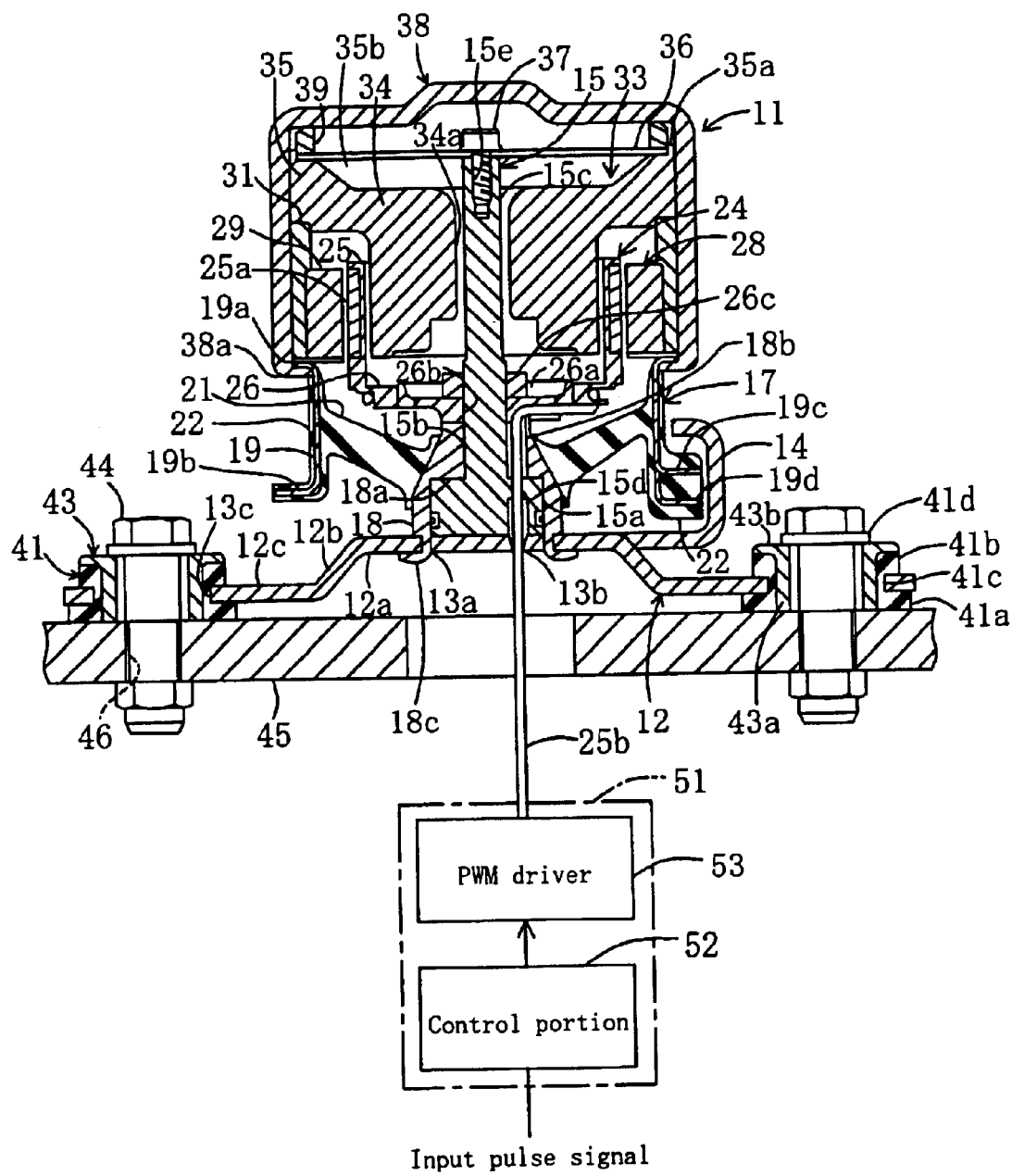
FIG. 1 is a partial sectional view showing schematically an entire structure of the active dynamic damper applied to a vehicle according to an embodiment of the present invention.
Figure 2:
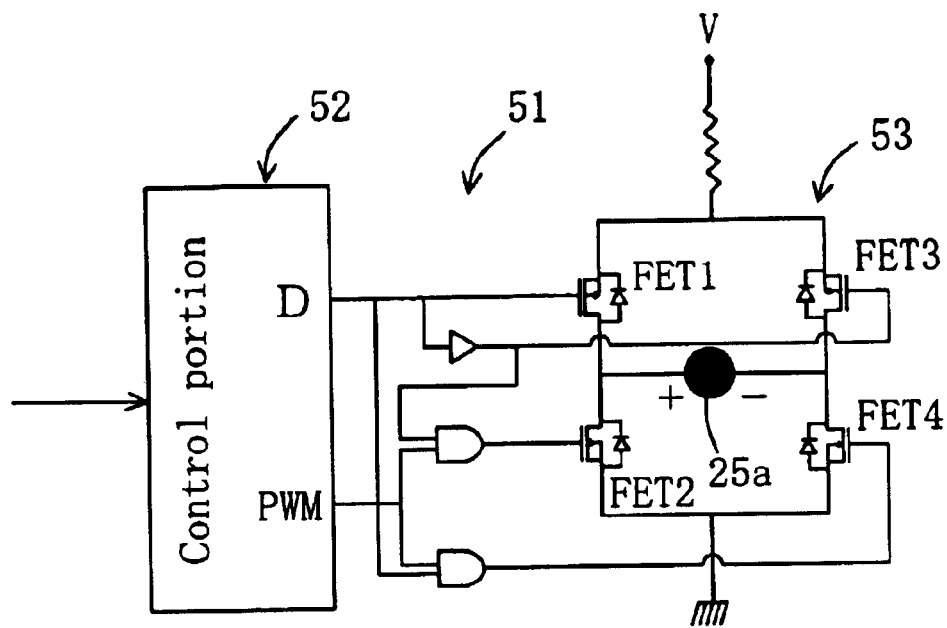
FIG. 2 is a block diagram showing schematically an electric control unit of the same active dynamic damper.

Hereinafter, the preferred embodiment of the present invention will be described with reference to the accompanying drawings. FIG. 1 shows schematically an entire structure of the active dynamic damper installed on a vibration damping object such as a vehicle body of the embodiment through a partial sectional view. FIG. 2 shows an electric control unit for controlling the driving of the active dynamic damper through a block diagram. This active dynamic damper comprises a damper main body 11 and an electric control unit 51 for generating a vibration force by controlling the driving of the damper main body 11.

The damper main body 11 comprises a long flat mounting plate portion 12, a rod-like central supporting metal member 15 erected in the center of a top face of the mounting plate portion 12 and constituting a supporting member together with the mounting plate portion 12, cylindrical rubber bushings 17 mounted around the central supporting metal member 15 successively from its bottom, a coil member 24, a magnet member 28, a yoke 33 and a cylindrical case 38 placed on the yoke 33. In the mean time, the relation in structure of the damper main body 11 in its vertical and transverse directions is the same as indicated in FIG. 1.

The mounting plate portion 12 is formed by bending a rectangular metallic plate at positions substantially ⅓ in the length direction and in a symmetrical construction comprised of an intermediate plate portion 12a, inclined portions 12b which are inclined downward from both ends of the intermediate plate portion 12a in the length direction and a pair of side plate portions extending from the inclined portions in parallel to each other. Multiple engaging holes 13a are made in the center portion of the intermediate plate portion 12a at multiple positions on a circle of a predetermined radius such that they run through. A through hole 13b is made inside the arrangement positions of the engaging holes 13a in the intermediate plate portion 12a such that it runs through the plate. Further, mounting holes 13c are provided at end positions in the length direction of both the side plate portions 12c such that they run through the plates. Further, a stopper portion 14 is extended horizontally from an end portion in the length direction (right end in the same Figure) of the intermediate plate portion 12a. The stopper portion 14 is formed by bending a metallic plate into a substantially fallen U shape and constituted of a lower horizontal portion, a vertical portion and an upper horizontal portion which is provided by bending back the metallic plate at a top end of the vertical portion.

The central supporting metal member 15 is comprised of a large-diameter portion 15a which is short in the axial direction length, a medium-diameter portion 15b which is longer than the large-diameter portion 15a and whose outside diameter is substantially half, and a small-diameter portion 15c whose diameter is slightly smaller than that of the medium-diameter portion 15b and which is longer than half of the entire axial direction length, these portions being disposed coaxially in succession from its bottom. The outside diameter of the large-diameter portion 15a is equal to a distance between inner ends of the engaging holes 13a opposing each other in a diameter direction. The large-diameter portion 15a has a through hole 15d which runs through in an axial direction thereof. A screw hole 15e extending in the axial direction is provided in a front end of the small-diameter portion 15c.

The rubber bushing 17 is comprised of an inner cylindrical metal member 18, an outer cylindrical metal member 19 disposed outside the inner cylindrical metal member 18 coaxially such that it opposes the inner cylindrical metal member 18 in the diameter direction, and a rubber elastic connecting portion 21 which connects both the metal members 18 and 19 elastically. The length in the axial direction of the inner cylindrical metal member 18 is equal to a distance from the bottom end of the large-diameter portion 15a of the central supporting metal member 15 up to substantially a middle position of the medium-diameter portion 15b. The inner peripheral face of the inner cylindrical metal member 18 has a step 18a on a border between the large-diameter portion 15a and the medium-diameter portion 15b so that it is composed of double cylindrical faces having equal inner diameters to the outer diameters of the large-diameter portion 15a and the medium-diameter portion 15b. As for the outer periphery of the inner cylindrical metal member 18, its lower side is cylindrical while its upper side has an inclined face like a truncated cone. The insertion hole 18b, which penetrates axially, is made in the inclined face of the inner cylindrical metal member 18. Attachment pieces 18c which can be inserted into the engaging holes 13a are provided on a bottom end of the inner cylindrical metal member 18.

In the outer cylindrical metal member 19, its cylindrical top end in the axial direction is bent slightly outwardly in the diameter direction so as to form an upper flange portion 19a while its bottom end is bent more largely outwardly in the diameter direction than the upper flange portion 19a so as to form a lower flange portion 19b. In only one part in the peripheral direction (right portion in FIG. 1) of the outer cylindrical metal member 19, its bottom end portion is cut out slightly so that the length in the axial direction is shortened, the lower flange portion acting as an upper engaging piece 19c. A metal piece extending downward in the axial direction is fixed to the upper engaging piece 19c and a portion of this metal piece bent outwardly in the diameter direction acts as a lower engaging piece 19d. The lower engaging piece 19d is situated below the lower flange portion 19b.

The rubber elastic connecting portion 21, which is a ring-like thick plate made of rubber elastic body, is formed by vulcanization between the inclined face portion on the outer periphery of the inner cylindrical metal member 18 and the inner peripheral face of the outer cylindrical metal member 19. Thin rubber elastic covering portion 22, which is formed simultaneously with the rubber elastic connecting portion 21, is provided on an entire surface of the inner and outer peripheries of the outer cylindrical metal member 19 including the upper and lower flange portions 19a and 19b and a thick covering portion 22a is provided on only top and bottom surfaces of the upper and lower engaging pieces 19c and 19d. The rubber bushing 17 formed in this way is attached by engaging the inner cylindrical metal member 18 with the large-diameter portion 15a and the medium-diameter portion 15b of the central supporting metal member 15 and then, the attachment pieces 18c are inserted into the engaging holes 13a in the mounting plate 12 and a projecting portion thereof projecting from the engaging hole 13a is bent so that it is engaged with the intermediate plate portion 12a. Consequently, the inner cylindrical metal member 18 is fixed to the mounting plate portion 12. As a result, the central supporting metal member 15 is also fixed to the mounting plate portion 12. As shown in FIG. 1, the upper and lower engaging pieces 19c and 19d of the inner cylindrical metal member 18 are disposed such that they are apart from an upper horizontal portion and a lower horizontal portion of a stopper portion 14 in the vertical direction. This stopper portion 14 suppresses an excessive deflection of the outer cylindrical metal member 19, subsequently the magnet member 28, the yoke 33 and the case 38 in the vertical direction.

The coil member 24 is comprised of a cylindrical coil mounting portion 25 and a bottom plate portion 26 which closes the bottom face thereof. A coil 25a is wound around the coil mounting portion 25. The bottom plate portion 26 is a substantially circular plate having a concave portion 26a in the center thereof. A mounting hole 26b having the same diameter as the medium-diameter portion 15b is provided in the center of the concave portion 26a. As for the coil member 24, a lead wire 25b extending from a front end of the coil 25a is extended downward through the insertion hole 18b in the inner cylindrical metal member 18, the insertion hole 15d in the large-diameter portion 15a and the insertion hole 13b in the intermediate plate portion 12a and then, the mounting hole 26b is fit to the medium-diameter portion 15b in the central supporting metal member 15, so that the coil member 24 is mounted on the medium-diameter portion 15b. The coil member 24 is firmly fixed to the medium-diameter portion 15b in a condition that it is pressed by a ring-like fixing member 26c set on the medium-diameter portion 15b of the central supporting metal member 15.

The magnet member 28 is comprised of a cylindrical magnet portion 29 located on the side of the center thereof and an outer metal member 31 on the side of its outer periphery. The inside diameter of the magnet portion 29 is slightly larger than the outside diameter of the aforementioned coil 25a and the outside diameter of the outer metal member 31 is substantially equal to the outside diameter of the upper flange 19a of the outer cylindrical metal member 19. In the outer metal member 31, a substantially lower half portion of its inner peripheral face is slightly larger in diameter than its upper portion and the magnet portion 29 is fit to the lower half portion having such a larger diameter by pressure. The magnet member 28 is disposed coaxially with the central supporting metal member 15 and placed on a top face of the upper flange 19a of the outer cylindrical metal member 19 with a uniform clearance provided between the inner peripheral face of the magnet portion 29 and the outer peripheral face of the coil 25a. The magnet member 28 and the coil member 24 constitute the vibration means.

The yoke 33 is integrally comprised of a cylindrical portion 34 and a thick flange portion 35 whose top end is extended outwardly in the diameter direction. The outside diameter of the cylindrical portion 34 is slightly smaller than the inside diameter of the coil mounting portion 25 of the coil member 24. The inside diameter of an axial hole 34a is slightly larger than the outside diameter of the small-diameter portion 15c of the central supporting metal member 15. The top face of the flange portion 35 is higher, on the outer peripheral edge 35a side, than the top face of the cylindrical portion 34 so that a cone-like inclined face is provided from the outer peripheral edge portion 35a to an outer peripheral edge of the cylindrical portion 34. Consequently, a concave portion 35b is formed including the top face of the cylindrical portion 34. A circular leaf spring 36 is placed on the top end of the outer peripheral edge portion 35a and a bolt 37 is inserted into a mounting hole provided in the center of the leaf spring 36 and driven into a screw hole 15e provided coaxially in a top end of the small-diameter portion 15c so as to fix the leaf spring 36 to the small-diameter portion 15c. The yoke 33 constitutes mainly the mass member including the magnet member 28 and the case 38.

The case 38 is a cylindrical metal member whose top end is sealed with its top plate; whose inside diameter is equal to the outside diameter of the flange portion 35 of the yoke 33 and that of the outer metal member 31 of the magnet member 28; and whose axial direction length is slightly longer than the length of the flange portion 35 plus the outer metal member 31. The case 38 is placed on the leaf spring 36 from above and pressed through a ring-like spacer 39 placed on an outer periphery of the top face of the leaf spring 36 while a cylindrical bottom end portion 38a thereof is bent in the axial center direction. Then, the bent bottom end portion 38a is engaged with the upper flange portion 19a of the outer cylindrical metal member 19 of the rubber bushing 17 by crimping, and the case 38 is fixed to the upper flange portion 19a, thereby forming the damper main body 11.

A grommet 41, which is a cylindrical supporting member made of rubber elastic body, is inserted into each mounting hole 13c in the side plate portion 12c of the mounting plate portion 12. The grommet 41 is comprised of a large-diameter portion 41a which is located on the bottom side in the axial direction, and a small-diameter portion 41b located on the top side, while an annular groove portion 41c is provided in an outer peripheral face between the large-diameter portion 41a and the small-diameter portion 41b. If the annular groove portion 41c of the grommet 41 is fit to the mounting hole 13c, the grommet 41 is fixed on the side plate portion 12c. Further, a mounting metal member 43 is press-fit into the axial hole 41d of the grommet 41 from the small-diameter portion 41b side. The mounting metal member 43 is comprised of a cylindrical portion 43a and a flange portion 43b whose top end is projected outwardly in the diameter direction. The cylindrical portion 43a is shorter in the axial direction than the grommet 41 and the outside diameter of the cylindrical portion 43a is larger than the inside diameter of the grommet 41.

After the grommets 41 are attached to the mounting holes 13c and the mounting metal members 43 are press-fit to the axial holes 41d in the grommets 41 with the flange portion 43b facing upward, the damper main body 11 is placed on a mating plate-like member 45 which is a vibration damping object; and then the damper main body 11 is secured by bolts and nuts 44 with the axial holes in the mounting metal members 43 aligned with the mounting holes 46 in the mating plate-like member 45. Consequently, the damper main body 11 is fixed to the mating plate-like member 45 through the compressed grommets 41 and in a condition that it is floated over the mating plate-like member 45.

Figure 3:
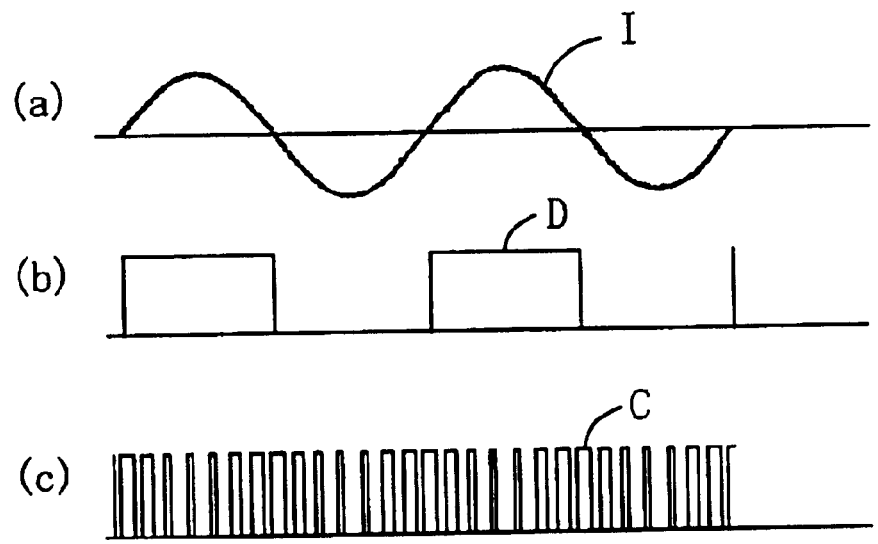
FIG. 3 is an explanatory diagram for explaining an instruction signal I, reference pulse signal D, and PWM signal C of the same active dynamic damper.

Next, the electric control unit 51, which is a drive control means for controlling power supply condition to the coil member 24 of the damper main body 10, will be described. As shown in FIGS. 1 and 2, the electric control unit 51 comprises a control portion 52 constituted of a microcomputer or the like and a PWM driver 53 so as to generate an instruction signal I, which is a pseudo sine wave signal as indicated in FIG. 3(a) for driving the coil 25a. An input pulse signal, which is an output of a rotation pulse sensor or the like attached on an engine which is a vibration generating source, is inputted to the input side of the control portion 52. Further, the coil 25a is connected to the output side of the PWM driver 53 through the lead wire 25b.

When a vibration input of frequency (100–200 Hz) synchronous with the vibration of an engine which is a vibration generating source of a vehicle is input in the control portion 52, the control portion 52 adjusts the phase of the inputted vibration with the same frequency so as to generate a reference pulse signal D having a duty ratio corresponding to the amplitude of the inputted vibration and outputs it at a sampling cycle of 1–2 kHz. Further, the control portion 52 generates and outputs a PWM signal C, which is a carrier signal having a carrier frequency of 4–20 kHz subjected to PWM modulation as shown in FIG. 3(c).

The PWM driver 53 is a FET bridge circuit in which first and second lines each comprised of two FETs connected in series are connected in parallel. A coil 25a is connected, through a lead wire 25b, to an output side of the FET bridge circuit which connects the middle between the FET1 and FET2 of the first line to the middle between the FET3 and FET4 of the second line. A power supply V is connected between both ends of the parallel connection of the first and second lines. An input line of the reference pulse signal D is connected to the gate terminal of the FET1 of the first line, and an AND input line of NOT input of the reference pulse signal D and an input of the PWM signal is connected to a gate terminal of the FET2 of the first line. A NOT input line of the reference pulse signal D is connected to a gate terminal of the FET3 of the second line while an AND input line of an input of the reference pulse signal D and an input of the PWM signal C is connected to a gate terminal of the FET4 of the second line. A control pulse signal in which the PWM signal C is overlaid on the reference pulse signal D is outputted from the AND input line.

If the reference pulse signal D and the PWM signal C are inputted from the control unit 52 to the PWM driver 53, when the reference pulse signal D is turned ON, the FET1 and FET4 are turned ON so that the instruction signal I, which is a positive pseudo sine wave, flows to the coil 25a. When the reference pulse signal D is OFF, the FET2 and FET3 are turned ON so that the instruction signal I, which is a negative pseudo sine wave, flows to the coil 25a inversely. Because the signal inputted to the FETs 2 and 4 is a control pulse signal overlaid with the PWM signal, the instruction signal I, which is the pseudo sine wave, is outputted.

Next, an operation of the above-described embodiment will be described.

If an input pulse signal which is a vibration input is inputted to the control portion 52 from the vibration generating source, the input pulse signal is sampled at a predetermined sampling cycle by the control unit 52, so that the reference pulse signal D is generated and simultaneously, the PWM signal C synchronous with this signal is generated and both the signals are outputted to the PWM driver 53. Consequently, the instruction signal I of a magnitude corresponding to that of the vibration input is formed by the PWM driver 53 and inputted to the coil 25a. Consequently, the yoke 33, which is the mass member, and the like are vibrated vertically in the axial direction with respect to the central supporting metal member 15 by an attraction and repellent action of magnetic force of the coil 25a with respect to the magnet portion 29. As a result, the dynamic damper can actively and effectively damp a vibration input of the frequency of 100–200 Hz from the mating plate member 45 by a resonant action between the vibration of this yoke 33 and the like and the rubber elastic body connecting portion 21.

Because the mounting plate portion 12 is fixed to the mating plate member 45 with the bolts and nuts 44 through the grommets 41 made of rubber elastic body in a condition that it is apart from the mating plate member 45, which is a vibration damping object, the grommets 41 suppress generation of a chattering vibration and abnormal sounds of more than several kHz such as a sharp sound originated from the carrier frequency of the PWM signal C and a rattling sound originated from the sampling frequency of the input pulse signal.

Further because the grommets 41 act as a passive damper as well as the rubber elastic body connecting portion 21, vibration damping performance thereof at the frequency of the vibration input is far more enhanced than conventional methods. Consequently, the dimensions of the dynamic damper can be decreased relatively. Because the grommet 41 has a resonant region at about 500 Hz, which is higher than the frequency of the input vibration and lower than the control frequency, a vibration force of a frequency higher than the frequency of the vibration input can be raised, so that, for example, gear noise or the like can be reduced. A new resonant peak position by the grommet can be set up to various values depending on the material, hardness, tightening strength and the like of the grommet.

Next, a result of a specific execution of the above-described embodiment will be described.

Figure 4A:
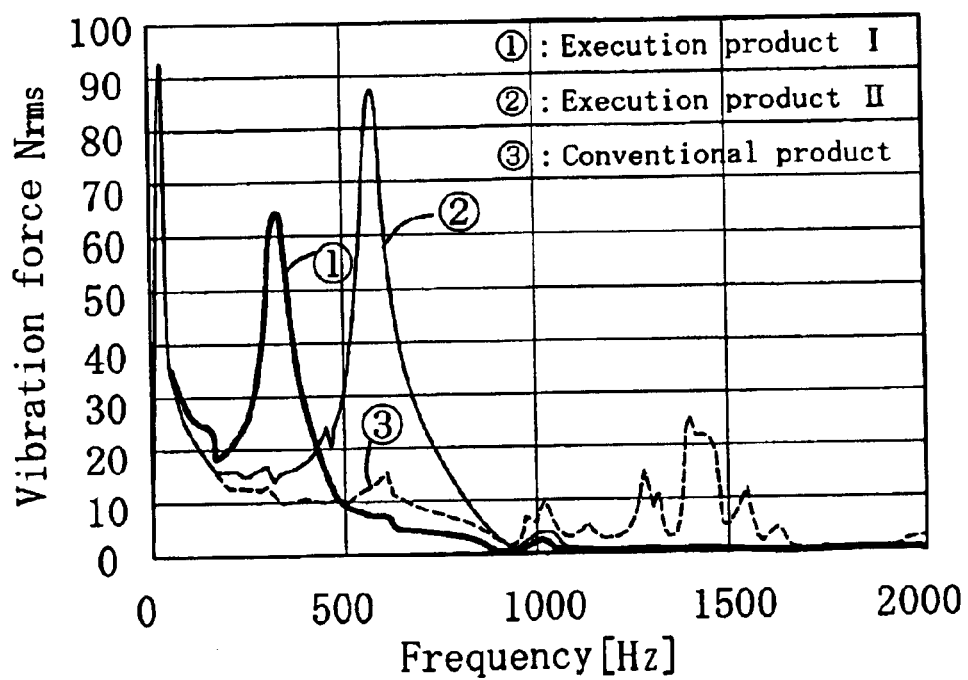
FIG. 4 is a graph showing the relation between the vibration force and frequency for explaining a result of a specific embodiment.
Figure 4B:
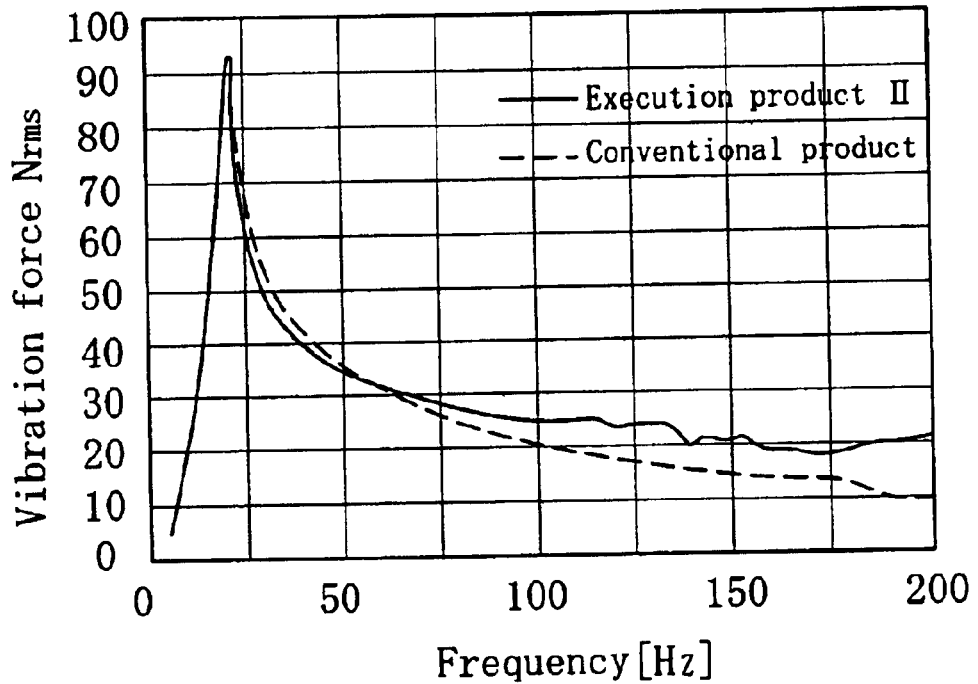

As execution objects of the dynamic dampers, two kinds of the dynamic dampers, that is, an execution product I in which the grommet rubber was soft and an execution product II in which the grommet rubber was hard, were prepared and for comparison, a conventional product without any grommet was also prepared. For these execution products and the conventional product, the frequency characteristics of their vibration forces were measured. FIG. 4(a) shows the frequency characteristic in a wide range of 0–2000 Hz while FIG. 4(b) shows the detailed frequency characteristic in a range of 0–200 Hz.

As evident from FIG. 4(a), the vibration force which caused the abnormal sound and the chattering vibration in the PWM control frequency range of 1000–1700 Hz as seen in the conventional product was suppressed to almost zero in the execution products I, II. Further, as evident from FIG. 4(a), in the execution products I, II, a peak in the vibration force was recognized in the frequency range of 100–200 Hz of a vibration input not seen in the conventional product and near 300 Hz, 600 Hz off the PWM control frequency range. These are resonant regions inherent of the grommet, so that gear noise and the like in this frequency range can be damped effectively. Further, as evident from FIG. 4(b), the vibration force in the range of 100–200 Hz in the execution products I, II, which is the frequency range of the vibration input, is higher than the conventional product, thereby indicating that the provision of the grommets in the execution products I, II intensifies the damping effect of the vibration input as compared to the conventional product.

Next, a modification of this embodiment will be described.

Figure 5:
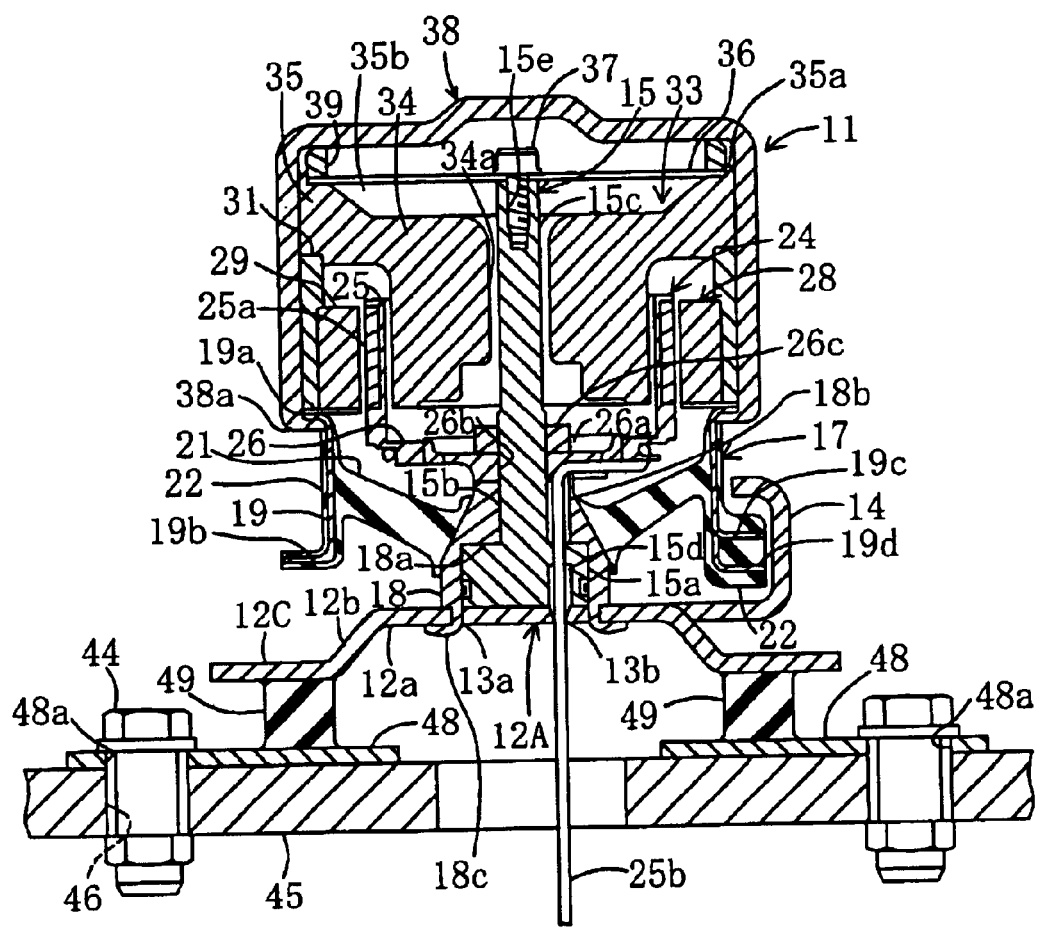
FIG. 5 is a partial sectional view showing schematically an entire structure of an active dynamic damper according to a modification.

As shown in FIG. 5, in the dynamic damper 10, instead of a pair of the grommets 41 and the mounting metal members 43, a pair of supporting plates 48 were used for the mounting plate portion 12A. Unlike the above-described side plate portion 12c, the side plate portion 12C of the mounting plate portion 12A is short in the length direction and has no mounting hole. The supporting plate 48 is slightly longer than the side plate portion 12C in the length direction and has a mounting hole 48a on one side thereof. Then, a rubber elastic body supporting portion 49 is bonded and fixed between the side plate portion 12C and the supporting plate 48 such that the side plate portion 12C opposes the other side of the supporting plate 48. By tightening the bolts and nuts 44 inserted into the mounting hole 48a, the supporting plate 48 is fixed onto the mating plate member 45. Consequently, the dynamic damper is fixed to the mating plate member 45 through the rubber elastic body supporting portion 49 such that it is floated over the mating plate member 45. As a result, the same effect as the above-described embodiment is obtained by the modification.

Further, as a rubber elastic body supporting portion, it is permissible to use just the rubber elastic body plate instead of the grommets or the example indicated in the above modification and fix the mounting plate on the mating plate member through that rubber elastic body plate such that it is floated with respect thereto. Further, it is also permissible to use a rubber bushing in which the inner cylindrical metal member and the outer cylindrical metal member are connected through the rubber elastic body.

Although, according to the above respective embodiments, the control pulse signal is formed by overlaying the reference pulse signal D with the PWM signal C, the present invention is not restricted thereto. For example, it is permissible to form a PWM modulated drive control pulse signal by operation performing based on the reference pulse signal D. Further, to form the PWM signal, it is permissible to be not only a cyclic pulse but also random cycle pulse. Additionally, the control pulse signal can be formed based on similar methods. Although the active dynamic damper of the above-described embodiment is an electromagnetic type in which the mass member is vibrated by a combination of an electromagnet which is attained by supplying electricity to a coil and a permanent magnet, the present invention can be applied to a pneumatic type dynamic damper in which the mass member is vibrated by changes in pressure in an air chamber.

The active dynamic damper of the present invention can be applied to not only a vehicle but also applications of restricting a vibration from various kinds of vibration generating sources. The above embodiments are examples of the present invention, and may be modified in various ways within a scope not departing from the gist of the present invention.

What is claimed is:

1. An active dynamic damper comprising: a supporting member having a mounting plate portion and a central supporting portion fixed to a center of a surface of the mounting plate portion; a mass member which surrounds the central supporting portion of the mounting plate portion and is disposed such that the mass member is departed from the mounting plate portion, the mass member configured to vibrate along an axial direction of said central supporting portion; a rubber elastic body connecting portion configured to connect the central supporting portion of the supporting member with the mass member elastically; and a vibration element configured to vibrate the mass member with a driving force generated by an input of a control pulse signal corresponding to vibration of a vibration generating source, said mounting plate portion being fixed on a vibration damping object member, wherein said mounting plate portion is fixed on the vibration damping object member through a rubber elastic supporting portion such that said mounting plate portion is departed from said vibration damping object member.

2. The active dynamic damper according to claim 1 wherein said control pulse signal is formed by overlaying a pulse width modulated carrier signal having a control frequency of several kHz to several tens of kHz on a reference pulse signal having a same frequency as a vibration frequency of an input pulse signal corresponding to vibration of a vibration generating source and adjusted in terms of phase and gain.

3. The active dynamic damper according to claim 2 wherein a resonance frequency of said rubber elastic body supporting portion with respect to said mass member is set up to a frequency region higher than said vibration frequency and lower than the control frequency of said carrier signal.

* * * * *